US012313410B2

(12) United States Patent
Rech et al.

(10) Patent No.: US 12,313,410 B2
(45) Date of Patent: May 27, 2025

(54) METHOD, APPARATUS AND COMPUTER PROGRAM FOR A VEHICLE

(71) Applicant: VOLKSWAGEN AKTIENGESELLSCHAFT, Wolfsburg (DE)

(72) Inventors: Bernd Rech, Bokensdorf (DE); Sandra Kleinau, Rötgesbüttel (DE); Andreas Pfadler, Berlin (DE)

(73) Assignee: VOLKSWAGEN AKTIENGESELLSCHAFT (DE)

( * ) Notice: Subject to any disclaimer, the term of this patent is extended or adjusted under 35 U.S.C. 154(b) by 271 days.

(21) Appl. No.: 18/003,723

(22) PCT Filed: Jun. 29, 2021

(86) PCT No.: PCT/EP2021/067915
§ 371 (c)(1),
(2) Date: Dec. 29, 2022

(87) PCT Pub. No.: WO2022/002976
PCT Pub. Date: Jan. 6, 2022

(65) Prior Publication Data
US 2023/0288211 A1    Sep. 14, 2023

(30) Foreign Application Priority Data

Jul. 2, 2020   (EP) .................................... 20183745

(51) Int. Cl.
*G01C 21/30* (2006.01)
*B60W 60/00* (2020.01)

(52) U.S. Cl.
CPC ........... *G01C 21/30* (2013.01); *B60W 60/001* (2020.02); *B60W 2556/40* (2020.02)

(58) Field of Classification Search
CPC . G01C 21/30; B60W 60/001; B60W 2556/40; G01S 19/50; G05D 1/0291;
(Continued)

(56) References Cited

U.S. PATENT DOCUMENTS 10,766,493 B2    9/2020   Buburuzan et al.
2008/0316060 A1  12/2008  Sewaki
(Continued)

FOREIGN PATENT DOCUMENTS

DE    102017008389 A1    3/2018
EP       3557893 A1    10/2019
(Continued)

OTHER PUBLICATIONS

"Llatser, I. et.al., 'Cooperative Automated Driving Use Cases for 5G V2X Communication', 2019" (Year: 2019).*
(Continued)

*Primary Examiner* — Sahar Motazedi
(74) *Attorney, Agent, or Firm* — BARNES & THORNBURG LLP

(57) ABSTRACT

A method, an apparatus, and a computer program for a transportation vehicle to determine positions of other transportation vehicles based on received collective perception messages. The method includes receiving one or more collective perception messages providing information on an absolute position of a transportation vehicle generating the collective perception message and a relative position of one or more further transportation vehicles being perceived by the transportation vehicle generating the collective perception message; placing the respective transportation vehicle generating the collective perception message and the one or more further transportation vehicles being perceived by the transportation vehicle generating the collective perception message on a map using the positions received in the one or (Continued)

more collective perception messages; and correlating the positions of the transportation vehicles on the map with a course of the road on which the respective transportation vehicles are travelling.

22 Claims, 2 Drawing Sheets

(58) Field of Classification Search
CPC ..... H04W 4/025; H04W 4/029; H04W 4/024; G08G 1/0112; G08G 1/096791
See application file for complete search history.

(56) References Cited

U.S. PATENT DOCUMENTS

| | | | |
|---|---|---|---|
| 2010/0198513 A1* | 8/2010 | Zeng | G01S 13/931 |
| | | | 701/300 |
| 2013/0278441 A1 | 10/2013 | Rubin et al. | |
| 2018/0247537 A1 | 8/2018 | Oh et al. | |
| 2018/0319403 A1* | 11/2018 | Buburuzan | G06V 20/56 |
| 2019/0294966 A1 | 9/2019 | Khan et al. | |
| 2019/0339082 A1 | 11/2019 | Doig et al. | |
| 2019/0342859 A1 | 11/2019 | Rubin et al. | |
| 2022/0005353 A1* | 1/2022 | Hwang | H04W 4/40 |
| 2023/0017247 A1* | 1/2023 | Hwang | G01S 19/24 |
| 2023/0076030 A1* | 3/2023 | Baek | H04W 24/10 |

FOREIGN PATENT DOCUMENTS

| | | |
|---|---|---|
| JP | 2018534693 A | 11/2018 |
| WO | 2018128946 A1 | 7/2018 |
| WO | 2019201845 A1 | 10/2019 |

OTHER PUBLICATIONS

Office Action; Japanese Patent Application No. 2022-581567; Mar. 5, 2024.
Extended European Search Report; European Patent Application No. 20183745.7; Jan. 12, 2021.
International Search Report and Written Opinion; International Patent Application No. PCT/EP2021/067915; Oct. 4, 2021.

* cited by examiner

ME THOD, APPARATUS AND COMPUTER PROGRAM FOR A VEHICLE

PRIORITY CLAIM

This patent application is a U.S. National Phase of International Patent Application No. PCT/EP2021/067915, filed 29 Jun. 2021, which claims priority to European Patent Application No. 20183745.7, filed 2 Jul. 2020, the disclosures of which are incorporated herein by reference in their entireties.

SUMMARY

Illustrative embodiments relate to a method, an apparatus, and a computer program for a transportation vehicle, more specifically, to a method, an apparatus, and a computer program for determining positions of other transportation vehicles based on received collective perception messages.

BRIEF DESCRIPTION OF THE DRAWINGS

Disclosed embodiments will be described with reference to the accompanying figures, in which.

DETAILED DESCRIPTION

Figure 1A:
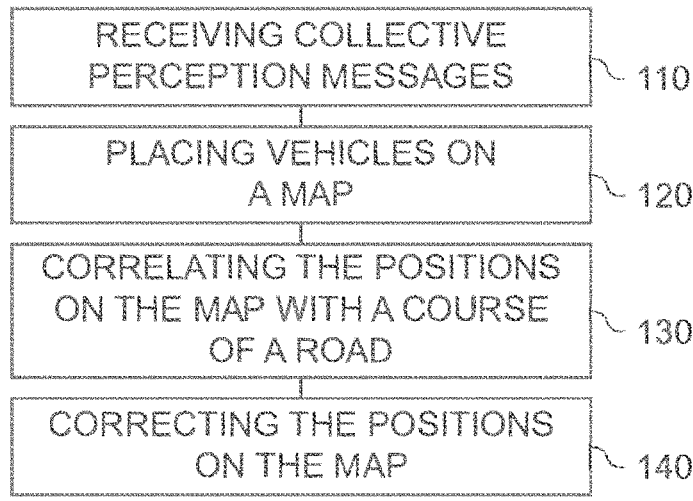
FIGS. 1a and 1b show flow charts of exemplary embodiments of a disclosed method for a transportation vehicle.

Direct communication between mobile devices, also referred to as device-to-device (D2D), vehicle-to-vehicle (V2V), or car-to-car communication (C2C), has been a feature under development of newer generations of mobile communication systems. By enabling direct communication between transportation vehicles, message exchange can be enabled at low latencies. These messages can be used to share information among road participants.

One type of message being exchanged among transportation vehicles are "collective perception messages" (CPM), which is being standardized at the European Telecommunications Standards Institute (ETSI). They contain an abstract representation of the environment of the transportation vehicle generating the CPM. Such messages may be used by a transportation vehicle to perceive other transportation vehicles that are currently not within sensor reach of the transportation vehicle. Within a CPM, other objects, such as other transportation vehicles, are generally referenced relative to a position of the transportation vehicle generating the CPM. In other words, the CPMs may contain the position of the sending transportation vehicle in absolute coordinates and information on objects detected by the vehicle sensors relative to them. These objects may be other road users, especially other transportation vehicles. Information on pedestrians can also be sent in as CPM objects. This topic is dealt with in various research projects and is an important application for increasing traffic safety, e.g., for permanently installed roadside sensor systems at intersections. In addition, information about static objects can also be sent as CPM objects, e.g., road works barriers.

There may be a desire for providing an improved concept for determining positions of other transportation vehicles based on received collective perception messages. This desire is addressed by the subject matter of the independent claims.

Disclosed embodiments are based on the finding that, while the relative positions of the other transportation vehicles that are referenced in a CPM may be suitably accurate relative to the transportation vehicle generating the CPM, the absolute position of the transportation vehicle generating the CPM, as determined through a satellite positioning system, may lead to inaccuracies in the determination of the positions of the transportation vehicles. For example, both an absolute position and a heading of the transportation vehicle generating the CPM may have a low degree of accuracy, so that positions of the other transportation vehicles, which are defined relative to the position of the transportation vehicle generating the CPM, can be slightly off in the perception of the transportation vehicle receiving the CPM. Disclosed embodiments may seek to overcome this limitation by correlating both the position of the transportation vehicle generating the CPM and the positions of the transportation vehicles being referenced in the CPM with a course of a road, and correcting the positions accordingly.

Disclosed embodiments provide a method for a transportation vehicle. The method comprises receiving one or more collective perception messages. Each collective perception messages comprises information on an absolute position of a transportation vehicle generating the collective perception message and a relative position of one or more further transportation vehicles being perceived by the transportation vehicle generating the collective perception message. The method comprises placing the respective transportation vehicle generating the collective perception message and the one or more further transportation vehicles being perceived by the transportation vehicle generating the collective perception message on a map using the positions received in the one or more collective perception messages. The method comprises correlating the positions of the transportation vehicles on the map with a course of the road on which the respective transportation vehicles are travelling. The method comprises correcting the respective positions based on the correlation between the course of the road and the positions of the transportation vehicles. By using both the position of the transportation vehicle generating the CPM and the positions of the transportation vehicles being referenced in the CPM, the respective positions may be corrected with a high degree of accuracy, e.g., by translating and/or rotating the respective transportation vehicles together relative to the map.

In some exemplary embodiments, the positions of the transportation vehicles might not (only) be considered as discrete positions, but rather as trajectories of transportation vehicles traveling on the road. Accordingly, the method may comprise tracking the positions of the transportation vehicles, as received in the one or more collective perception messages, to determine trajectories of the transportation vehicles. The trajectories of the transportation vehicles may be correlated with the course of the road on which the respective transportation vehicles are travelling. The respective positions of the transportation vehicles may be corrected based on the correlation between the course of the road and the trajectories of the transportation vehicles. This may further increase the accuracy, while reducing the effort required to correlate the positions with the course of the road over time.

For example, correlating the trajectories of the transportation vehicles with the course of the road may comprise determining, for each position, a confidence region around the position, and determining, for each trajectory, based on the confidence regions around the positions of the trajectory, a confidence region around the trajectory. The respective positions on the map may be corrected using the confidence region around the trajectory, e.g., by limiting the correlation to the confidence region. For example, the confidence region around the trajectory may be considered a "confidence tube" around the trajectory, which may shrink, and therefore become more precise, over time.

In general, messages being exchanged between transportation vehicles may comprise a temporary identifier that is regularly changed to avoid long-time tracking of transportation vehicles while enabling short-term identification. For example, each collective perception message may comprise an identifier of the transportation vehicle generating the collective perception message. The identifier may be changed to a newly generated identifier according to a pre-defined schedule. The method may comprise determining a match between positions received in a collective perception message having a newly generated identifier and previously determined trajectories, and continuing the tracking of the respective positions and the determination of the respective trajectories using subsequently received collective perception messages with the newly generated identifier. In other words, if the identifier of a transportation vehicle changes, the method may try to determine a match between the newly generated identifier and previously determined trajectories to continue tracking the trajectories.

In various exemplary embodiments, the positions and/or trajectories of the transportation vehicles on the map that originate from the same collective perception message are jointly correlated with the course of the road. For example, the positions and/or trajectories of the transportation vehicles on the map that originate from the same collective perception message may be jointly translated and/or rotated relative to the map to correlate the respective transportation vehicles with the course of the road. This may decrease the effort required for the correlation, and improve the accuracy, as the transportation vehicles remain in a static arrangement.

In various exemplary embodiments, the positions and/or trajectories of the transportation vehicles on the map may be correlated with the course of the road based on one or more lanes of the road. Additionally or alternatively, the positions and/or trajectories of the transportation vehicles on the map may be correlated with the course of the road based on one or more traffic rules on the road. Both the lanes of the road and the respective traffic rules may provide valuable contextual information for the correlation.

In general, the corrected positions may be used by the transportation vehicle to identify other transportation vehicles in the vicinity of the transportation vehicle. For example, the method may comprise determining a position of one or more transportation vehicles in a vicinity of the transportation vehicle via one or more sensors of the transportation vehicle. The method may comprise determining a relationship between the transportation vehicles on the map and the one or more transportation vehicles in the vicinity of the transportation vehicle based on the corrected positions of the transportation vehicles on the map. For example, the transportation vehicles on the map may be matched to the one or more transportation vehicles in the vicinity of the transportation vehicle based on the corrected positions of the transportation vehicles on the map. By using the corrected positions of the transportation vehicles on the map, the determination of the relationship between the positions may be facilitated and/or become more accurate.

In some exemplary embodiments, additional information about the one or more transportation vehicles in the vicinity of the transportation vehicle may be determined using the sensor of the transportation vehicle. This information may be added to the information that is previously known about the respective transportation vehicle. In other words, the method may comprise supplementing information on the transportation vehicles on the map based on the determined relationship between the transportation vehicles on the map and the one or more transportation vehicles in the vicinity of the transportation vehicle.

In some cases, the same transportation vehicle may be perceived by multiple transportation vehicles, and thus included in multiple collective perception messages. Accordingly, the method may match the transportation vehicles that are perceived by multiple transportation vehicles on the map. In other words, at least a first collective perception message may be received from a first transportation vehicle and a second collective perception message may be received from a second transportation vehicle. The method may comprise matching transportation vehicles referenced in the first collective perception message and transportation vehicles referenced in the second collective perception message based on the positions comprised in the respective collective perception message and/or based on the corrected positions of the transportation vehicles.

In various exemplary embodiments, the corrected positions may be used to help the transportation vehicle navigate autonomously or semi-autonomously among the other transportation vehicles. In other words, the method may comprise operating the transportation vehicle in an autonomous or semi-autonomous driving mode using the corrected positions of the transportation vehicles on the map.

Disclosed embodiments of the present disclosure further provide a corresponding computer program having a program code for performing the presented method, when the computer program is executed on a computer, a processor, or a programmable hardware component.

Disclosed embodiments of the present disclosure further provide a corresponding apparatus for a transportation vehicle. The apparatus comprises an interface for receiving collective perception messages from other transportation vehicles. The apparatus comprises a processing module, configured to perform the above-presented method. Disclosed embodiments further provide the transportation vehicle comprising the apparatus and/or the transportation vehicle being configured to perform the method.

Various example embodiments will now be described more fully with reference to the accompanying drawings in which some example embodiments are illustrated. In the figures, the thicknesses of lines, layers or regions may be exaggerated for clarity. Optional components may be illustrated using broken, dashed, or dotted lines.

Accordingly, while example embodiments are capable of various modifications and alternative forms, embodiments thereof are shown by way of example in the figures and will herein be described in detail. It should be understood, however, that there is no intent to limit example embodiments to the particular forms disclosed, but on the contrary, example embodiments are to cover all modifications, equivalents, and alternatives falling within the scope of the disclosure. Like numbers refer to like or similar elements throughout the description of the figures.

As used herein, the term, "or" refers to a non-exclusive or, unless otherwise indicated (e.g., "or else" or "or in the alternative"). Furthermore, as used herein, words used to describe a relationship between elements should be broadly construed to include a direct relationship or the presence of intervening elements unless otherwise indicated. For example, when an element is referred to as being "connected" or "coupled" to another element, the element may be directly connected or coupled to the other element or intervening elements may be present. In contrast, when an element is referred to as being "directly connected" or "directly coupled" to another element, there are no intervening elements present. Similarly, words such as "between", "adjacent", and the like should be similarly interpreted.

The terminology used herein is for the purpose of describing particular embodiments only and is not intended to be limiting of example embodiments. As used herein, the singular forms "a," "an" and "the" are intended to include the plural forms as well, unless the context clearly indicates otherwise. It will be further understood that the terms "comprises," "comprising," "includes" or "including," when used herein, specify the presence of stated features, integers, operations, elements or components, but do not preclude the presence or addition of one or more other features, integers, operations, elements, components or groups thereof.

Unless otherwise defined, all terms (including technical and scientific terms) used herein have the same meaning as commonly understood by one of ordinary skill in the art to which example embodiments belong. It will be further understood that terms, e.g., those defined in commonly used dictionaries, should be interpreted as having a meaning that is consistent with their meaning in the context of the relevant art and will not be interpreted in an idealized or overly formal sense unless expressly so defined herein.

Figure 1B:
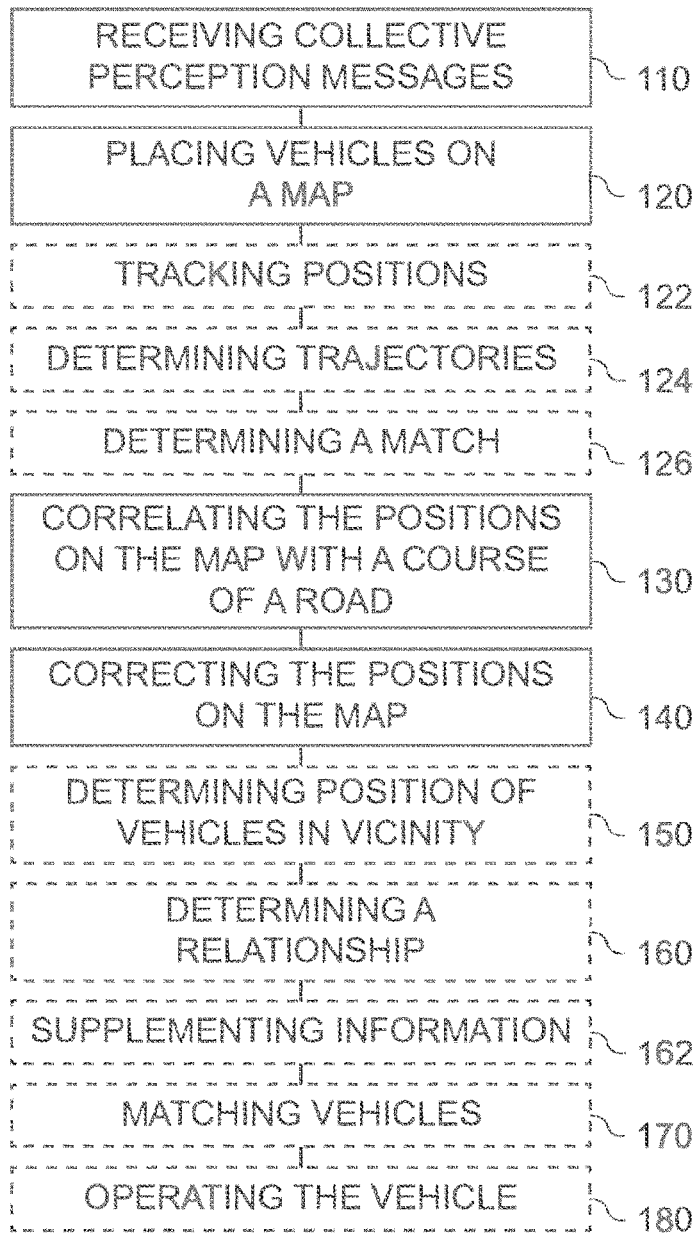

FIGS. 1a and 1b show flow charts of examples of a method for a transportation vehicle 100. The method comprises receiving 110 one or more collective perception messages (CPMs). Each collective perception messages comprises information on an absolute position of a transportation vehicle generating the collective perception message and a relative position of one or more further transportation vehicles being perceived by the transportation vehicle generating the collective perception message. The method comprises placing 120 the respective transportation vehicle generating the collective perception message and the one or more further transportation vehicles being perceived by the transportation vehicle generating the collective perception message on a map using the positions received in the one or more collective perception messages. The method comprises correlating 130 the positions of the transportation vehicles on the map with a course of the road on which the respective transportation vehicles are travelling. The method comprises correcting 140 the respective positions based on the correlation between the course of the road and the positions of the transportation vehicles.

Figure 1C:
FIG. 1c shows a block diagram of an exemplary embodiment of a disclosed apparatus for a transportation vehicle.

FIG. 1c shows a block diagram of an example of a corresponding apparatus 10 for the transportation vehicle. The apparatus 10 comprises an interface 12 for receiving the collective perception messages from other transportation vehicles 200. The apparatus comprises a processing module 14, configured to perform the method of FIGS. 1a and/or 1b, e.g., in conjunction with the interface 12. The processing module 14 is coupled with the interface 12, and optionally, with one or more perception sensors of the transportation vehicle (not shown). FIG. 1c further shows the transportation vehicle 100 comprising the apparatus 10.

The following description relates to the method of FIGS. 1a and/or 1b and to the corresponding apparatus 10 or transportation vehicle 100.

Various exemplary embodiments of the present disclosure relate to a method, apparatus, and computer program for a transportation vehicle, e.g., a so-called "connected" vehicle, i.e., a transportation vehicle that comprises an interface 12 for communicating with other transportation vehicles in its vicinity. In the context of the present application, such transportation vehicles may be called V2X vehicles, i.e., transportation vehicles equipped for V2X (Vehicle-to-Anything) communication. Such transportation vehicles may communicate directly with each other, i.e., without involving any base station transceiver, which is also referred to as Vehicle-to-Vehicle (V2V) Device-to-Device (D2D) communication. Technologies enabling such D2D/V2V or V2X-communication include 802.11p and beyond, 3GPP (Third Generation Partnership Project) system (4G (4th Generation), 5G (5th Generation), NR (New Radio) and beyond), etc. For example, transportation vehicles exchange certain messages, for example, CPMs, Cooperative Awareness Messages (CAM) or Decentralized Environment Notification Messages (DENM), etc. The content of such messages may enable recipients to become aware of their environment and determine a map of the environment of the transportation vehicle. For example, the transportation vehicle 100 may also be denoted ego-vehicle, as the perspective of the proposed concept is focused on this transportation vehicle.

Various exemplary embodiments of the present disclosure relate to a concept for an association of CPM objects into an environment model of the ego-vehicle with the help of prior knowledge. In general, a CPM comprises an abstract representation of an environment of the transportation vehicle generating the CPM, as perceived by the transportation vehicle generating the CPM. Within a CPM, other objects, such as other transportation vehicles, are generally referenced relative to a position of the transportation vehicle generating the CPM. In other words, the CPMs may contain the position of the sending transportation vehicle (i.e., the transportation vehicle generating the CPM) in absolute coordinates and information on objects detected by the transportation vehicle sensors relative to them. These objects may be other road users, especially other transportation vehicles. Information on pedestrians can also be sent as CPM objects. The proposed concept may be limited to transportation vehicles other than CPM objects. Accordingly, each collective perception messages comprises information on the absolute position (i.e., in absolute coordinates) of a transportation vehicle generating the collective perception message and a relative position (i.e., in coordinates relative to the transportation vehicle generating the CPM) of the one or more further transportation vehicles being perceived by the transportation vehicle generating the collective perception message. (using perception sensors of the transportation vehicle).

An assignment between CPM sending transportation vehicles (i.e., transportation vehicles generating the CPM message) and the CPM objects detected by them (and referenced in the CPM) to the objects detected by the receiving transportation vehicles themselves is usually very difficult and often even impossible. The reason is that CPM-transmitting transportation vehicles often cannot determine their ego-pose (location and orientation) with sufficient accuracy. The information on the CPM objects detected by them is correspondingly imprecise. In addition to measurement and calibration inaccuracies of the sensors, errors in the estimation of their transportation vehicle orientation (heading) also have an effect here. Angular errors have a particularly large impact when detecting distant objects.

In contrast to some other concepts, the presently proposed concept might not only focus on the association of the transportation vehicles sending the V2X messages (CAM, DENM, CPM), but also deals with the association of the CPM objects, i.e., the transportation vehicles sent in the CPM and detected by the CPM transportation vehicles with their sensors.

The proposed concept may comprise one or more of the following features:

Receiving 110 CPM messages

Storing the received CPM messages, for example, in a table to create a history

Placing 120 the CPM sending transportation vehicle and its CPM objects on a map (i.e., a V2X environment map)

Improving the allocation to lanes and locations based on logical connections (e.g., by correlating 130 the CPM sending transportation vehicle and the CPM objects with the course of the road, and correcting 140 the positions on the map accordingly)

High-level fusion 150 of the transportation vehicles detected by the Ego vehicle and the corresponding CPM objects from the V2X environment map To use the proposed method, the recipient transportation vehicle (i.e., the transportation vehicle 100) may comprise one or more pieces of the following equipment:

a V2X receiver unit (e.g., the interface 12), which enables reception of CPM, CAM and DENM A digital map with sufficient accuracy, such as a high-definition map (representing the course of the road)

A system for ego-localization (e.g., a Global Positioning System receiver)

A sensor system for object detection, e.g., camera, LIDAR, radar etc.

A calculation unit (e.g., the processing module) for calculating an environment model and for associating V2X vehicles and CPM objects One or more of the following measures are taken to perform the association:

A V2X environment map may be created. In the context of this application, the V2X environment map may also be referenced as the map on which the respective transportation vehicles are placed. In some exemplary embodiments, the positions of the transportation vehicles referenced in the CPM messages may be stored in a V2X environment table, and the V2X environment table may be used to generate the map. Based on the received CPM message, the position of the sending transportation vehicle (with its confidence ellipse/region) and the transportation vehicle heading may be stored in a V2X environment table. Furthermore, the CPM objects may be stored in this table with the specification of their confidence levels specified in the CPM (e.g., in x, y, and z direction relative to the coordinate system of the CPM vehicle, hereinafter referred to as confidence distances). Order criteria for the table may be sender pseudonyms (i.e., the identifier contained in the CPM message) and transmission time.

The V2X environment table may be updated periodically. It may be limited to a pre-defined time period, e.g., to the last 30 seconds. Like a circular buffer, the obsolete information may be replaced by new information and can be stored elsewhere if necessary. The contents of the V2X environment table may be entered into the digital map. In other words, the method comprises placing 120 the respective transportation vehicle generating the collective perception message and the one or more further transportation vehicles being perceived by the transportation vehicle generating the collective perception message on a map using the positions received in the one or more collective perception messages. For example, the positions received in the one or more collective perception messages may comprise, for each CPM, the absolute position of the transportation vehicle generating the CPM and one or more positions relative to the absolute position of the transportation vehicle generating the CPM for the one or more further transportation vehicles. For example, the (V2X environment) map may be a static map, comprising a course of one or more roads, intersections, traffic infrastructure (lights, signs, crossings, etc.), buildings, etc.

The (V2X environment) map may comprise static and dynamic objects in the environment of the transportation vehicle along at least a part of the vehicle's trajectory. Such a part of the trajectory may be, for example, the part the transportation vehicle is planning to travel in the next 30s, 1 minute, 5 minutes, 10 minutes, etc. A dynamic object is one that is not permanently static/fixed such as other road participants, pedestrians, vehicles, but also semi-static objects such as components of a moving construction side, traffic signs for road or lane narrowing, etc. For example, such dynamic objects may be other vehicles, pedestrians, bicycles, road participants, etc. When determining the environmental model not all objects in the model may be determined with the same confidence. There are objects for which a higher certainty can be achieved than for others. For example, if multiple CPMs or sensors can identify or confirm a certain object its presence and/or state of movement can potentially be determined with a higher confidence compared to a case in which only data from a single CPM or sensor is indicative of an object.

For the CPM-sending vehicles, trajectories for the paths they travel and confidence tubes (i.e., confidence regions around the trajectories) may be derived from their positions and/or confidence ellipses. In other words, the method may comprise tracking 122 the positions of the transportation vehicles, as received in the one or more collective perception messages, to determine 124 trajectories of the transportation vehicles. For example, the trajectory of a transportation vehicles may be derived from the individual positions of the transportation vehicle over time. The method may comprise determining, for each position, a confidence region around the position. For example, the CPM may comprise information on a confidence of the absolute position of the transportation vehicle generating the CPM, which may be used to generate the confidence region around the position. For the paths travelled by each CPM object, confidence distances in x, y and z direction contained in the CPM may result in trajectories with confidence tubes (i.e., confidence regions around the trajectories). The width of the confidence tubes can vary if the confidence changes during the observation period. The method may comprise determining, for each trajectory, based on the confidence regions around the positions of the trajectory, a confidence region around the trajectory (e.g., by combining the confidence regions around the positions. These may later be used to correct the positions on the map, e.g., by limiting the correlation to the confidence regions around the positions or trajectories. In other words, the respective positions on the map may be corrected using the confidence region around the trajectory. Each confidence tube may contain a trajectory that results from the positions sent with the CPM. The trajectories of the perceived CPM objects may be derived from, or composed of, their individual positions. They may be supplemented by the confidence tubes. If individual CPM messages were not received, the missing positions may be estimated or interpolated from the neighboring values, for example, by averaging. The positions of the sending V2X vehicle may be specified in the CPM in absolute coordinates. The values of the CPM objects (trajectories, confidence tubes) may be relative to them. Outliers may be discarded and a best-fit of the trajectory and confidence tube (relative to the lanes of the road) may be performed according to the case of non-received messages.

In many cases, the trajectories might not be clearly assigned to the lanes on the map. Therefore, in further actions, using logical relationships, e.g., using an ontology or rules, corrections may be made and the trajectories and confidence tubes may be moved. The method comprises correlating 130 the positions of the transportation vehicles on the map with a course of the road on which the respective transportation vehicles are travelling. For example, correlating the positions of the transportation vehicles on the map with the course of the road may comprise determining, how the transportation vehicles best fit onto the course of the road without violating constraints and/or according to logical relationships, e.g., without driving between lanes or beside the road, or without violating traffic rules. The respective positions are corrected 140 accordingly, i.e., based on the correlation between the course of the road and the positions of the transportation vehicles. For example, the correlation between the course of the road and the positions of the transportation vehicles may relate to positions of the transportation vehicles relative to the course of the road that best fit the constraints and/or logical relationships. The values of the corrected trajectories/positions and/or confidence tubes may be stored in a second table. The table with the original values may be retained so that it can be made available later, e.g., for control purposes or further corrections. A probability for the correctness of each correction may be estimated and stored, which can then be processed during association.

In case of jumps in the position data of the transmitting transportation vehicle (i.e., the transportation vehicle generating the CPM), caused, e.g., by measurement errors of its ego-localization (e.g., possible with GPS systems), a section-by-section correction of the trajectory and the confidence tube may be performed. The trajectories and confidence tubes of its CPM objects may be corrected accordingly.

For the correction for the CPM vehicles as well as the CPM objects, one or more of the following logical relationships, among others, can be used:

For example, the correction may take into account the passable and non-passable areas (that are shown) on the map. For example, a transportation vehicle cannot drive through a building or next to a bridge. In other words, the positions of the transportation vehicles are correlated with the course of the road. The positions and/or trajectories of the transportation vehicles on the map may be correlated with the course of the road based on one or more lanes of the road. Additionally or alternatively, the correction may take into account the logical relationships when moving CPM objects as a group. The CPM-sending vehicle and its CPM objects form a group that may be inserted into the map as a whole by translation and rotation. In other words, the positions and/or trajectories of the transportation vehicles on the map that originate from the same collective perception message may be jointly correlated with the course of the road. In other words, during the correlation, the positions and/or trajectories of the transportation vehicles on the map that originate from the same collective perception message may retain their positions relative to each other during the correlation. For example, the positions and/or trajectories of the transportation vehicles on the map that originate from the same collective perception message may be jointly translated and/or rotated relative to the map to correlate the respective transportation vehicles with the course of the road. Additionally or alternatively, the correction may take into account logical relationships that result from the shape of the trajectory, such as radii or distances travelled to a prominent point, such as the start of a curve. Additionally or alternatively, the correction may take into account the valid traffic regulations. They may be used for plausibility checks and to determine the probability of correction correctness. In other words, the positions and/or trajectories of the transportation vehicles on the map are correlated with the course of the road based on one or more traffic rules on the road.

As has been pointed out before, not only positions, but also trajectories of the transportation vehicles may be considered when correlating the positions with the course of the road. In other words, the trajectories of the transportation vehicles may be correlated 130 with the course of the road on which the respective transportation vehicles are travelling. The respective positions of the transportation vehicles may be corrected 140 based on the correlation between the course of the road and the trajectories of the transportation vehicles.

In addition to the V2X environment map, another map or model may be generated, which may be denoted the object environment map. In the following, the creation of an object environment map is discussed. In parallel to the above operations for creating the V2X environment map, the transportation vehicle may constantly detect objects in its environment using its sensors. The method may comprise determining 150 a position of one or more transportation vehicles in a vicinity of the transportation vehicle via one or more sensors of the transportation vehicle. For example, the transportation vehicle may comprise visual/optical (camera), radar, ultrasonic, lidar (light detection and ranging) or other sensors. The object environment map may be a digital model of the environment of the transportation vehicle, which is based on sensor data of the transportation vehicle. The transportation vehicle may model its surroundings using this sensor data.

The generation of the object environment map may contain measurement inaccuracies in object detection and inaccuracies in ego-localization. The positions of each object may be entered into an object environment table and/or the object environment map. For each transportation vehicle, histories of the observed distance travelled (trajectories, position-time progression) may also be stored. The ego trajectory and the ego confidence tube may also be included in the object environment map. The object environment table or the object environment map may be periodically updated.

In the following, a matching of objects from the object map and the V2X environment map is discussed. For example, the transportation vehicles in the object environment map may now be compared with the transportation vehicles from the corresponding area of the V2X environment map. Because the range of V2X communication is often greater than the sensor range, the environment map may usually only include a subset of the V2X environment map. The trajectories of the objects detected by the sensors and the trajectories of the V2X objects (CAM, DENM, CPM transmission vehicles and CPM objects) may be compared. In other words, the method may comprise determining 160 a relationship between the transportation vehicles on the map and the one or more transportation vehicles in the vicinity of the transportation vehicle based on the corrected positions of the transportation vehicles on the map. For example, the transportation vehicles on the map may be matched to the one or more transportation vehicles in the vicinity of the transportation vehicle based on the corrected positions of the transportation vehicles on the map. Statistical methods may be used for this. Among other things, the spatial course and the velocity profile may be considered. From a threshold to be defined (e.g., correlation measure) an assignment can be made, i.e., a V2X transmitter or a CPM object may be assigned to a detected transportation vehicle. The assignment may also take into account information contained in the V2X messages such as the transportation vehicle class (truck, car). The assignment may also take into account the probability of trajectory correction of V2X vehicles. The information that is gathered via the sensors may be used to augment the information contained in the V2X environment map. Accordingly, the method may comprise supplementing 162 information on the transportation vehicles on the map based on the determined relationship between the transportation vehicles on the map and the one or more transportation vehicles in the vicinity of the transportation vehicle, e.g., by improving the precision of the positions and/or trajectories of the respective transportation vehicles.

CPM objects can also be CAM (Cooperative Awareness Message) or DENM (Decentralized Environmental Notification Message) sending vehicles, or other CPM sending vehicles. It is also possible that one transportation vehicle has been identified as a CPM object by several CPM-sending vehicles. For example, at least a first collective perception message may be received 110 from a first transportation vehicle and a second collective perception message may be received from a second transportation vehicle. In various exemplary embodiments, the task may be therefore to resolve these ambiguities, and to determine a match between the transportation vehicles. In other words, the method may comprise matching 170 transportation vehicles referenced in the first collective perception message and transportation vehicles referenced in the second collective perception message based on the positions comprised in the respective collective perception message and/or based on the corrected positions of the transportation vehicles.

In various exemplary embodiments, the corrected map entries may be used for this purpose. In a first operation, the affected V2X vehicles or CPM objects may be identified. For example, a measure of the spatial proximity or overlap of trajectories and confidence tubes can be used for this. Next, criteria may be considered which allow a plausibility check that it is the same object. Suitable criteria are, for example, the comparison of speed-time curves (started decelerating at the same time) or angle-time curves for changes in transportation vehicle orientation (heading). Furthermore, information contained in V2X messages such as the transportation vehicle class (truck, car) can be taken into account. Statistical methods may be used here. From a threshold to be defined (e.g., correlation measure) an assignment can be made.

Ambiguities may be removed from the map. The eliminated objects may be saved in another table to allow later checks and corrections. For example, the objects remaining in the map may be marked as detected multiple times. In some exemplary embodiments, multiple detection of individual objects may take place over a longer period of time, e.g., because this results from the flow of traffic and transportation vehicles drive virtually parallel to each other. In this case, a plausibility check can be simplified and, for example, only take place at intervals that are to be defined, i.e., as a periodic confirmation. When deleting duplicates, an assessment may be made on which object is deleted and which is kept. For this purpose, an assessment may be made on which information is probably more accurate. The less accurate ones may be deleted. In some exemplary embodiments, during this operation, a correction of the object positions is made and only the corrected values remain in the map.

In general, each collective perception message comprises an identifier of the transportation vehicle generating the collective perception message. The identifier may be changed to a newly generated identifier according to a pre-defined schedule (which may be static or based on the number of transportation vehicles in the vicinity). When changing the pseudonym (by generating a new identifier), a V2X vehicle disappears and a new one is created. Therefore, a plausibility check may be performed to ensure that both transportation vehicles are identical. The method may comprise determining 126 a match between positions received in a collective perception message having a newly generated identifier and previously determined trajectories. For example, if the positions received in a collective perception message having a newly generated identifier extend the previously determined trajectories, a match may be found. The method may comprise continuing the tracking 122 of the respective positions and the determination of the respective trajectories using subsequently received collective perception messages with the newly generated identifier. For example, it may be likely that the same transportation vehicle is involved if driving on with the same sensor set and the same perceived objects of the old pseudonym of the new pseudonym and the course of the road does not allow a new transportation vehicle to be reevaluated.

The generated V2X environment may be used to operate the transportation vehicle. In other words, the method may comprise operating 180 the transportation vehicle in an autonomous or semi-autonomous driving mode using the corrected positions of the transportation vehicles on the map. For example, the map comprising the corrected positions may be used by the transportation vehicle to determine the positions, (projected) trajectories and/or distances to other transportation vehicles in the vicinity of the transportation vehicle, which may be used to plot the course of the transportation vehicle on the road.

In disclosed embodiments, the interface 12 may correspond to any method or mechanism for obtaining, receiving, transmitting or providing analog or digital signals or information, e.g., any connector, contact, pin, register, input port, output port, conductor, lane, etc. which allows providing or obtaining a signal or information. An interface may be wireless or wireline and it may be configured to communicate, i.e., transmit or receive signals, information with further internal or external components. The interface 12 may comprise further components to enable according communication, e.g., in a mobile communication system, such components may include transceiver (transmitter and/or receiver) components, such as one or more Low-Noise Amplifiers (LNAs), one or more Power-Amplifiers (PAs), one or more duplexers, one or more diplexers, one or more filters or filter circuitry, one or more converters, one or more mixers, accordingly adapted radio frequency components, etc. The interface 12 may be coupled to one or more antennas, which may correspond to any transmit and/or receive antennas, such as horn antennas, dipole antennas, patch antennas, sector antennas etc. The antennas may be arranged in a defined geometrical setting, such as a uniform array, a linear array, a circular array, a triangular array, a uniform field antenna, a field array, combinations thereof, etc. In some examples the interface 12 may serve the purpose of transmitting or receiving or both, transmitting and receiving, information, such as information related to capabilities, control information, payload information, application requirements, trigger indications, requests, messages, data packets, acknowledgement packets/messages, etc.

As shown in FIG. 2a the interface 12 is coupled to the respective processing module 14 at the apparatus 10. In disclosed embodiments the processing module 14 may be implemented using one or more processing units, one or more processing devices, any method or mechanism for processing, such as a processor, a computer or a programmable hardware component being operable with accordingly adapted software. In other words, the described functions of the processing module 14 may as well be implemented in software, which is then executed on one or more programmable hardware components. Such hardware components may comprise a general-purpose processor, a Digital Signal Processor (DSP), a micro-controller, etc.

In disclosed embodiments, communication, i.e., transmission, reception, or both, may take place among transportation vehicles directly and/or between mobile transceivers/vehicles and a network component/entity (infrastructure or mobile transceiver, e.g., a base station, a network server, a backend server, etc.). Such communication may make use of a mobile communication system. Such communication may be carried out directly, e.g., by device-to-device (D2D) communication, which may also comprise vehicle-to-vehicle (V2V) or car-to-car (C2C) communication in case of transportation vehicles, and which may be carried out using the specifications of a mobile communication system.

In disclosed embodiments, the interface 12 can be configured to wirelessly communicate in the mobile communication system. For example, direct cellular vehicle-to-anything (C-V2X), where V2X includes at least V2V, V2-Infrastructure (V2I), V2-Pedestrian (V2P), etc., transmission according to 3GPP Release 14 onward can be managed by infrastructure (so-called mode 3 in LTE) or run in a UE (so-called mode 4 in LTE).

Various examples of the proposed concept may comprise recording of traces of the CPM-sending transportation vehicle as well as the detected objects described in the CPM. The proposed concept may comprise an assigning the positions/traces on a map (V2X environment map), and improving the allocation to lanes and locations based on logical relationships for both the CPM-sending vehicle as well as for the detected objects described in the CPM. Various examples may comprise recording the traces of objects observed with the transportation vehicle sensors, and assigning these traces on another map (the object-environment map). The proposed concept may provide a high-level fusion of the detected transportation vehicles and the corresponding objects from the V2X environment map, and an assessment of the correlation of the traces.

As already mentioned, in disclosed embodiments the respective methods may be implemented as computer programs or codes, which can be executed on a respective hardware. Hence, another exemplary embodiment is a computer program having a program code for performing at least one of the above methods, when the computer program is executed on a computer, a processor, or a programmable hardware component. A further exemplary embodiment is a computer readable storage medium storing instructions which, when executed by a computer, processor, or programmable hardware component, cause the computer to implement one of the methods described herein.

A person of skill in the art would readily recognize that operations of various above-described methods can be performed by programmed computers, for example, positions of slots may be determined or calculated. Herein, some exemplary embodiments are also intended to cover program storage devices, e.g., digital data storage media, which are machine or computer readable and encode machine-executable or computer-executable programs of instructions where the instructions perform some or all of the operations of methods described herein. The program storage devices may be, e.g., digital memories, magnetic storage media such as magnetic disks and magnetic tapes, hard drives, or optically readable digital data storage media. The disclosed embodiments are also intended to cover computers programmed to perform the operations of methods described herein or (field) programmable logic arrays ((F) PLAs) or (field) programmable gate arrays ((F) PGAs), programmed to perform the operations of the above-described methods.

The description and drawings merely illustrate the principles of the disclosed embodiments. It will thus be appreciated that those skilled in the art will be able to devise various arrangements that, although not explicitly described or shown herein, embody the principles of the disclosure and are included within its spirit and scope. Furthermore, all examples recited herein are principally intended expressly to be only for pedagogical purposes to aid the reader in understanding the principles of the disclosed embodiments and the concepts contributed to furthering the art, and are to be construed as being without limitation to such specifically recited examples and conditions. Moreover, all statements herein reciting principles and embodiments of the disclosure, as well as specific examples thereof, are intended to encompass equivalents thereof.

When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, Digital Signal Processor (DSP) hardware, network processor, application specific integrated circuit (ASIC), field programmable gate array (FPGA), read only memory (ROM) for storing software, random access memory (RAM), and non-volatile storage. Other hardware, conventional or custom, may also be included. Their function may be carried out through the operation of program logic, through dedicated logic, through the interaction of program control and dedicated logic, or even manually, the particular technique being selectable by the implementer as more specifically understood from the context.

It should be appreciated by those skilled in the art that any block diagrams herein represent conceptual views of illustrative circuitry embodying the principles of the disclosed embodiments. Similarly, it will be appreciated that any flow charts, flow diagrams, state transition diagrams, pseudo code, and the like represent various processes which may be substantially represented in computer readable medium and so executed by a computer or processor, whether or not such computer or processor is explicitly shown.

Furthermore, the following claims are hereby incorporated into the detailed description, where each claim may stand on its own as a separate exemplary embodiment. While each claim may stand on its own as a separate exemplary embodiment, it is to be noted that—although a dependent claim may refer in the claims to a specific combination with one or more other claims-other disclosed embodiments may also include a combination of the dependent claim with the subject matter of each other dependent claim. Such combinations are proposed herein unless it is stated that a specific combination is not intended. Furthermore, it is intended to include also features of a claim to any other independent claim even if this claim is not directly made dependent to the independent claim.

It is further to be noted that methods disclosed in the specification or in the claims may be implemented by a device having methods or mechanisms for performing each of the respective operations of these methods.

LIST OF REFERENCE SIGNS

10 Apparatus
12 Interface
14 Processing Module
100 Transportation vehicle
110 Receiving one or more collective perception messages
120 Placing transportation vehicles on a map
122 Tracking positions of transportation vehicles
124 Determining trajectories of the transportation vehicles
126 Determining a match
130 Correlating positions of the transportation vehicles with a course of a road
140 Correcting the respective positions
150 Determining a position of transportation vehicles in the vicinity of the transportation vehicle
160 Determining a relationship
162 Supplementing information
170 Matching transportation vehicles
180 Operating the transportation vehicle
200 Transportation vehicle(s)

The invention claimed is:

1. A method for a transportation vehicle to correct measurement errors of its ego-localization functionality resulting from satellite positioning system data received by the transportation vehicle, the method comprising:
receiving one or more collective perception messages, wherein each of the one or more collective perception messages comprises information on an absolute position of a transportation vehicle generating the collective perception message and a relative position of one or more further transportation vehicles being perceived by the transportation vehicle generating the collective perception message;
placing the transportation vehicle generating the collective perception message and the one or more further transportation vehicles being perceived by the transportation vehicle generating the collective perception message on a map based on the absolute and relative positions received in the one or more collective perception messages;
correlating positions of the transportation vehicles on the map with a course of a road on which the transportation vehicles are travelling, wherein the transportation vehicles comprise the transportation vehicle generating the collective perception message and the one or more further transportation vehicles;
correcting the positions of the transportation vehicles on the map based on the correlation between the course of the road and the positions of the transportation vehicles; and
tracking the positions of the transportation vehicles, as received in the one or more collective perception messages, to determine trajectories of the transportation vehicles, wherein the trajectories of the transportation vehicles are correlated with the course of the road on which the transportation vehicles are travelling, wherein the positions of the transportation vehicles are further corrected based on the correlation between the course of the road and the trajectories of the transportation vehicles,
wherein each of the one or more collective perception messages further comprises an identifier of the transportation vehicle generating the collective perception message, the identifier being changed to a newly generated identifier according to a pre-defined schedule,
wherein the method further comprises determining a match between transportation vehicle positions received in a collective perception message having a newly generated identifier and previously determined trajectories, and continuing the tracking of the positions of the transportation vehicles and the determination of the trajectories using subsequently received collective perception messages with the newly generated identifier,
whereby, the absolute position for the transportation vehicle generating the collective perception message, as determined through the satellite positioning system, that lead to inaccuracies in determination of the positions of the one or more further transportation vehicles defined relative to the position of the transportation vehicle generating the collective perception message, is corrected by correlating both the position of the transportation vehicle generating the collective perception message and the positions of the one or more further transportation vehicles being referenced in the collective perception message with the course of the road, and correcting the positions accordingly through use of both the position of the transportation vehicle generating the collective perception message and the positions of the one or more further transportation vehicles being referenced in the collective perception message, through translation or rotation of the transportation vehicles together relative to the map, and correcting the positions of the transportation vehicles based on the correlation between the course of the road and the trajectories of the transportation vehicles.

2. The method of claim 1, wherein the correlating of the trajectories of the transportation vehicles with the course of the road comprises determining, for each transportation vehicle position on the map, a confidence region around the position, and determining, for each trajectory of each transportation vehicle, based on the confidence regions around the positions used to determine the trajectory, a confidence region around the trajectory, wherein the transportation vehicle respective positions on the map are corrected using the confidence region around the corresponding trajectory.

3. The method of claim 1, wherein the transportation positions and/or the trajectories of the transportation vehicles on the map that originate from the same collective perception message are jointly correlated with the course of the road.

4. The method of claim 3, wherein the positions and/or the trajectories of the transportation vehicles on the map that originate from the same collective perception message are jointly translated and/or rotated relative to the map to correlate the transportation vehicles with the course of the road.

5. The method of claim 1, wherein the positions and/or the trajectories of the transportation vehicles on the map are correlated with the course of the road based on one or more lanes of the road, and/or wherein the positions and/or the trajectories of the transportation vehicles on the map are correlated with the course of the road based on one or more traffic rules on the road.

6. The method of claim 1, further comprising determining a position of one or more transportation vehicles in a vicinity of the transportation vehicle generating the collective perception message via one or more sensors of the transportation vehicle, and determining a relationship between the transportation vehicles on the map and the one or more transportation vehicles in the vicinity of the transportation vehicle generating the collective perception message based on the corrected positions of the transportation vehicles on the map.

7. The method of claim 6, wherein the transportation vehicles on the map are matched to the one or more transportation vehicles in the vicinity of the transportation vehicle based on the corrected positions of the transportation vehicles on the map.

8. The method of claim 6, further comprising supplementing information on the transportation vehicles on the map based on the determined relationship between the transportation vehicles on the map and the one or more transportation vehicles in the vicinity of the transportation vehicle.

9. The method of claim 1, wherein at least a first collective perception message is received from a first transportation vehicle and a second collective perception message is received from a second transportation vehicle, the method further comprising matching transportation vehicles referenced in the first collective perception message and transportation vehicles referenced in the second collective perception message based on the absolute and relative positions included in the received collective perception messages and/or based on the corrected positions of the transportation vehicles on the map.

10. The method of claim 1, further comprising controlling operation of the transportation vehicle in an autonomous or semi-autonomous driving mode using the corrected positions of the transportation vehicles on the map.

11. A non-transitory computer readable medium including a computer program having program code for performing the method of claim 1, when the computer program is executed on a computer, a processor, or a programmable hardware component.

12. An apparatus for a transportation vehicle to correct measurement errors of its ego-localization functionality resulting from satellite positioning system data received by the transportation vehicle, the apparatus comprising:
an interface for receiving collective perception messages from other transportation vehicles; and
a processor configured to:
receive one or more collective perception messages, wherein each of the one or more collective perception messages comprises information on an absolute position of a transportation vehicle generating the collective perception message and a relative position of one or more further transportation vehicles being perceived by the transportation vehicle generating the collective perception message;
place the transportation vehicle generating the collective perception message and the one or more further transportation vehicles being perceived by the transportation vehicle generating the collective perception message on a map based on the absolute and relative positions received in the one or more collective perception messages;
correlate positions of the transportation vehicles on the map with a course of a road on which the transportation vehicles are travelling, wherein the transportation vehicles comprise the transportation vehicle generating the collective perception message and the one or more further transportation vehicles;
correct the positions of the transportation vehicles on the map based on the correlation between the course of the road and the positions of the transportation vehicles; and
track the positions of the transportation vehicles, as received in the one or more collective perception messages, to determine trajectories of the transportation vehicles, wherein the trajectories of the transportation vehicles are correlated with the course of the road on which the transportation vehicles are travelling, wherein the positions of the transportation vehicles are further corrected based on the correlation between the course of the road and the trajectories of the transportation vehicles,
wherein each of the one or more collective perception messages further comprises an identifier of the transportation vehicle generating the collective perception message, the identifier being changed to a newly generated identifier according to a pre-defined schedule,
wherein the processor is further configured to determine a match between transportation vehicle positions received in a collective perception message having a newly generated identifier and previously determined trajectories, and continuing the tracking of the positions of the transportation vehicle and the determination of the trajectories using subsequently received collective perception messages with the newly generated identifier,
whereby, the absolute position for the transportation vehicle generating the collective perception message, as determined through the satellite positioning system, that lead to inaccuracies in determination of the positions of the one or more further transportation vehicles defined relative to the position of the transportation vehicle generating the collective perception message, is corrected by correlating both the position of the transportation vehicle generating the collective perception message and the positions of the one or more further transportation vehicles being referenced in the collective perception message with the course of the road, and correcting the positions accordingly through use of both the position of the transportation vehicle generating the collective perception message and the positions of the one or more further transportation vehicles being referenced in the collective perception message, through translation or rotation of the transportation vehicles together relative to the map, and correcting the positions of the transportation vehicles based on the correlation between the course of the road and the trajectories of the transportation vehicles.

13. A transportation vehicle comprising the apparatus of claim 12.

14. The apparatus of claim 12, wherein the correlation of the trajectories of the transportation vehicles with the course of the road includes determining, for each transportation vehicle position on the map, a confidence region around the position, and determining, for each trajectory of each transportation vehicle, based on the confidence regions around the positions used to determine the trajectory, a confidence region around the trajectory, wherein the transportation vehicle positions on the map are corrected using the confidence region around the corresponding trajectory.

15. The apparatus of claim 12, wherein the positions and/or the trajectories of the transportation vehicles on the map that originate from the same collective perception message are jointly correlated with the course of the road.

16. The apparatus of claim 15, wherein the positions and/or the trajectories of the transportation vehicles on the map that originate from the same collective perception message are jointly translated and/or rotated relative to the map to correlate the transportation vehicles with the course of the road.

17. The apparatus of claim 12, wherein the positions and/or the trajectories of the transportation vehicles on the map are correlated with the course of the road based on one or more lanes of the road, and/or
  wherein the positions and/or the trajectories of the transportation vehicles on the map are correlated with the course of the road based on one or more traffic rules on the road.

18. The apparatus of claim 12, wherein the processor is further configured to determine a position of one or more transportation vehicles in a vicinity of the transportation vehicle generating the collective perception message via one or more sensors of the transportation vehicle, and determine a relationship between the transportation vehicles on the map and the one or more transportation vehicles in the vicinity of the transportation vehicle generating the collective perception message based on the corrected positions of the transportation vehicles on the map.

19. The apparatus of claim 18, wherein the transportation vehicles on the map are matched to the one or more transportation vehicles in the vicinity of the transportation vehicle based on the corrected positions of the transportation vehicles on the map.

20. The apparatus of claim 18, wherein the processor is further configured to supplement information on the transportation vehicles on the map based on the determined relationship between the transportation vehicles on the map and the one or more transportation vehicles in the vicinity of the transportation vehicle.

21. The apparatus of claim 12, wherein at least a first collective perception message is received from a first transportation vehicle and a second collective perception message is received from a second transportation vehicle, wherein the processor is further configured to match transportation vehicles referenced in the first collective perception message and transportation vehicles referenced in the second collective perception message based on the absolute and relative positions included in the received collective perception message and/or based on the corrected positions of the transportation vehicles on the map.

22. The apparatus of claim 12, wherein the processor is further configured to control operation of the transportation vehicle in an autonomous or semi-autonomous driving mode using the corrected positions of the transportation vehicles on the map.

* * * * *